(12) United States Patent
Hand et al.

(10) Patent No.: US 11,512,968 B2
(45) Date of Patent: Nov. 29, 2022

(54) SYSTEMS AND METHODS FOR QUEUE MANAGEMENT OF PASSENGER WAYPOINTS FOR AUTONOMOUS VEHICLES

(71) Applicant: Ford Global Technologies, LLC, Dearborn, MI (US)

(72) Inventors: Michael Hand, Ypsilanti, MI (US); Christopher Nave, Ypsilanti, MI (US); Shubham Sharma, Canton, MI (US); Johnathon Gagnon, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 16/427,246

(22) Filed: May 30, 2019

(65) Prior Publication Data

US 2020/0378768 A1 Dec. 3, 2020

(51) Int. Cl.
*G01C 21/34* (2006.01)
*G05D 1/00* (2006.01)

(52) U.S. Cl.
CPC ....... *G01C 21/343* (2013.01); *G01C 21/3438* (2013.01); *G05D 1/0088* (2013.01); *G05D 2201/0213* (2013.01)

(58) Field of Classification Search
CPC .............. G01C 21/3438; G01C 21/343; G05D 1/0088; G05D 2201/0213
See application file for complete search history.

(56) References Cited

U.S. PATENT DOCUMENTS

| | | | |
|---|---|---|---|
| 9,910,438 B1 * | 3/2018 | Arden | G07C 5/008 |
| 2015/0185034 A1 | 7/2015 | Abhyanker | |
| 2016/0187150 A1 | 6/2016 | Sherman et al. | |
| 2016/0247095 A1 | 8/2016 | Scicluna et al. | |
| 2017/0169366 A1 | 6/2017 | Klein et al. | |
| 2018/0075565 A1 * | 3/2018 | Myers | G05D 1/0088 |
| 2018/0181128 A1 * | 6/2018 | Urano | G05D 1/0088 |
| 2018/0211541 A1 * | 7/2018 | Rakah | G08G 1/148 |
| 2018/0342157 A1 * | 11/2018 | Donnelly | G08G 1/0145 |
| 2019/0120640 A1 * | 4/2019 | Ho | G01C 21/3492 |
| 2019/0311307 A1 * | 10/2019 | Ramot | G01C 21/3438 |
| 2019/0353495 A1 * | 11/2019 | Dyer | G06Q 10/0639 |

OTHER PUBLICATIONS

Bohlsen, M. (Dec. 24, 2018). An Update on the Autonomous Vehicle and Ride Sharing Trend (7 pages). Retrieved from https://seekingalpha.com/article/4229925-update-autonomous-vehicle-ride-sharing-trend.

Welch, D. (Nov. 30, 2017). GM's Self-Driving Cars to be Ready for Ride-Sharing in 2019 (9 pages). Retrieved from https://www.bloomberg.com/news/articles/2017-11-30/gm-sees-self-driving-ride-share-service-ready-for-roads-in-2019.

* cited by examiner

*Primary Examiner* — Jelani A Smith
*Assistant Examiner* — Frank T Glenn, III
(74) *Attorney, Agent, or Firm* — Brandon Hicks; Eversheds Sutherland (US) LLP

(57) ABSTRACT

An autonomous vehicle comprising an integrated on-vehicle system having a queue management system configured to manage a queue of passenger waypoints, wherein the integrated on-vehicle system is configured to assign the passenger waypoints to a virtual driver system (VDS) of the autonomous vehicle.

20 Claims, 5 Drawing Sheets

|  | Inputs: | Ouputs: | | |
|---|---|---|---|---|
| 402 — Scenario 1 | #Occupied Seats: 4 |  | Presence ? | Update Count ? |
|  | Party 1 Confirm: Yes | Party 1: | Yes | No |
|  | Party 2 Confirm: Yes | Party 2: | Yes | No |
|  | Inputs: | Ouputs: | | |
| 404 — Scenario 2 | #Occupied Seats: 3 |  | Presence ? | Update Count ? |
|  | Party 1 Confirm: Yes | Party 1: | Yes | No |
|  | Party 2 Confirm: No | Party 2: | No | Possible |
|  | Inputs: | Ouputs: | | |
| 406 — Scenario 3 | #Occupied Seats: 3 |  | Presence ? | Update Count ? |
|  | Party 1 Confirm: No | Party 1: | Possible | Possible |
|  | Party 2 Confirm: No | Party 2: | Possible | Possible |
|  | Inputs: | Ouputs: | | |
| 408 — Scenario 4 | #Occupied Seats: 3 |  | Presence ? | Update Count ? |
|  | Party 1 Confirm: No | Party 1: | No | Possible |
|  | Party 2 Confirm: Yes | Party 2: | Yes | No |

FIG. 4

SYSTEMS AND METHODS FOR QUEUE MANAGEMENT OF PASSENGER WAYPOINTS FOR AUTONOMOUS VEHICLES

FIELD OF THE DISCLOSURE

The present disclosure relates to autonomous vehicles, and more particularly to systems and methods for queue management of passenger waypoints.

BACKGROUND

Autonomous vehicles, sometimes referred to as self-driving vehicles, include vehicles capable of moving within an environment with little or no human input. Through the use of a variety of sensors arranged to perceive their surroundings, autonomous vehicles can navigate roadways and move between two waypoints. Improvements in autonomous vehicles are needed in view of their increasing availability and use.

BRIEF DESCRIPTION OF THE DRAWINGS

Figures are illustrated by way of example and are not drawn to scale or intended to limit the scope of the disclosure.

FIG. 4 illustrates an exemplary logic determination regarding passengers in the vehicle in accordance with one or more embodiments of the disclosure.

DETAILED DESCRIPTION

Overview

Figure 1:
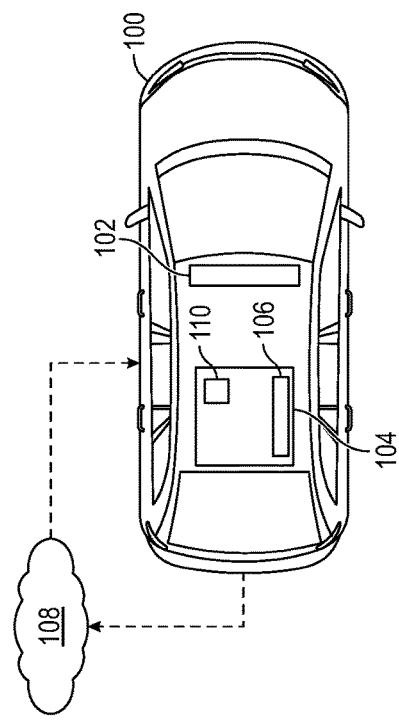
FIG. 1 illustrates a simplified view of a vehicle in accordance with one or more exemplary embodiments of the present disclosure.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

Autonomous vehicles are becoming increasingly integrated into modern transportation systems. With the rise of ride sharing, where multiple passengers ride together (often to different destinations), there exists a need for improved autonomous vehicle capability that can seamlessly pick up and drop off passengers without issue.

In accordance with one or more embodiments, an autonomous vehicle can include an integrated on-vehicle system having a queue management system. The queue management system can be configured to manage a queue of passenger waypoints associated with the autonomous vehicle. The passenger waypoints include locations for vehicle stopping, such as, for example, passenger pick-up locations and passenger drop-off locations. The passenger waypoints can also include stopping locations associated with the pick up or drop off of one or more goods to be transported to a destination. For instance, the passenger waypoint can correspond with meal delivery service, including, for example, restaurant pick up and remote diner drop off. As used herein, passenger waypoints can refer to pick up or drop off locations associated with passengers, goods, or both. The queue management system can be configured to manage one or more passenger pick-up or drop-off locations. The integrated on-vehicle system can be configured to communicate (e.g., assign) the passenger waypoints to a virtual driver system (VDS) associated with the autonomous vehicle.

In one or more embodiments, the integrated on-vehicle system can assign to the VDS each successive passenger waypoint after completion of the previous passenger waypoint. For example, a first passenger may be dropped off at a first location. Upon completion of a criteria associated with the drop-off of the first passenger (e.g., a prescribed proximity to the drop-off location or upon offboarding the first passenger), the integrated on-vehicle system can assign a second location for dropping off a second passenger. In an embodiment, assignment of the next (second) location occurs upon completion of a criteria associated with the previous passenger waypoint.

In one or more embodiments, the integrated on-vehicle system can be configured to operate (e.g., manage the queue of passenger waypoints) when the autonomous vehicle has high latency with one or more cloud servers or is out of range of wireless networks (e.g., cellular networks). In such a manner, the autonomous vehicle can perform uninterrupted passenger pick-up and drop-off in areas of low connectivity or high latency. Moreover, the integrated on-vehicle system can permit autonomous operation since it allows certain information associated with the passenger (e.g., drop off location) to be stored locally. Regardless of dropped signals, the integrated on-vehicle system can facilitate uninterrupted passenger transportation to drop-off locations.

In one or more embodiments, the integrated on-vehicle system can be configured to adjust a queue of passenger waypoints when a new passenger is picked up. For instance, in one exemplary embodiment, an autonomous vehicle may be transporting two passengers to first and second drop-off locations upon picking up a third passenger. If the third passenger's drop-off location is within a particular relationship with the first and second drop-off locations (e.g., on the way, less than a 3 minute deviation, etc.), the integrated on-vehicle system can be configured to rearrange the waypoints to first drop off the third passenger prior to reaching the first or second drop-off locations. By way of another example, changing road conditions such as traffic may warrant generation of a new route to a passenger drop-off location. The integrated on-vehicle system may adjust the passenger waypoints or the order thereof in response to the changed road condition.

In one or more embodiments, the integrated on-vehicle system can be configured to determine the presence of one or more passengers within the autonomous vehicle. The integrated on-vehicle system may further determine the presence of onboarding passengers and offboarding passengers. In a particular instance, the integrated on-vehicle system can be in communication with one or more detectors of the autonomous vehicle configured to monitor for passengers or a condition thereof. The one or more detectors can include motion detectors, weight detectors, cameras, or another suitable sensing element configured to detect the occurrence of a condition. The integrated on-vehicle system may use information relating to the presence of one or more passengers within the autonomous vehicle, for example, to facilitate updates to the waypoint guidance provided to the VDS. For example, if one or more passengers exits the vehicle prematurely, the integrated on-vehicle system can detect the changed passenger information and update the queue of passenger waypoints. In such a manner, the integrated on-vehicle system can intelligently adjust to changing human interactions so as to increase operational efficiency of the autonomous vehicle.

In one or more embodiments, the integrated on-vehicle system can determine a linger time during passenger onboarding and offboarding. The linger time can correspond with a duration of time associated with passenger onboarding and offboarding. If the linger time exceeds a threshold, the autonomous vehicle may take a prescribed action such as checking whether the vehicle contains any passengers or open doors. By way of a non-limiting example, the final passenger in an autonomous vehicle may leave a door of the vehicle ajar when offboarding, causing the autonomous vehicle to remain at the offboarding location. Upon reaching a prescribed linger time (e.g., a prescribed duration or a duration relative to a passenger-specific condition), the integrated on-vehicle system can monitor for conditions associated with an incidental issue preventing the vehicle from driving. If no passengers are detected and the linger time is exceeded, the autonomous vehicle may close the vehicle door. The autonomous vehicle can then continue driving to another waypoint. In such a manner, the autonomous vehicle may avoid unnecessary delays associated with incidental occurrences.

Illustrative Embodiments

FIG. 1 illustrates a simplified view of a vehicle 100 in accordance with one or more exemplary embodiments of the present disclosure. The vehicle 100 can be used, for example, in ride sharing or shuttling applications where the vehicle 100 picks up and drops off one or more passengers at a time.

In an embodiment, the vehicle 100 can be an autonomous vehicle including a virtual driver system (VDS) 102 in communication with an integrated on-vehicle system 104 having a queue management system 106 configured to manage a queue of passenger waypoints. While the following disclosure is made with respect to autonomous vehicles, the disclosure is not intended to be limited to autonomous vehicles, and in certain instances the use of the phrase "autonomous vehicles" may include semi-autonomous or even human-driven vehicles.

In an embodiment, the VDS 102 can perform functions associated with route navigation (e.g., selecting a particular route to a waypoint) and driving the vehicle 100 (e.g., speed management, lane management, and turning). The VDS 102 may further determine estimated times of arrival (ETAs) at waypoints and communicate the ETAs to the integrated on-vehicle system 104. The VDS 102 may include a logic device, such as at least one memory and at least one processor configured to execute computer-executable instructions. The logic device of the VDS 102 may be separate from the integrated on-vehicle system 104.

The integrated on-vehicle system 104 can perform functions associated with transportation as a service (TaaS). That is, the integrated on-vehicle system 104 can perform one or more intelligent operations to keep the vehicle 100 operational and in-service. In non-autonomous vehicles, TaaS is often handled by the human driver. For example, the driver may arrange passenger pick-ups and drop-offs through one or more ridesharing services and sequence the passenger waypoints themselves. The driver can further ensure that their vehicle is empty and that no remaining passengers are awaiting drop-off.

In an embodiment, the queue management system 106 may be configured to manage the queue of passenger waypoints associated with the vehicle 100. The queue management system 106 can be in communication with one or more servers, such as a cloud server 108. In an embodiment, the server 108 can inform the vehicle 100 of information relating to one or more passengers or to-be passengers associated with the vehicle 100. The information can include, for example, passenger pick-up and drop-off locations, number of passengers to board at a passenger pick-up location, special passenger requirements, or other information associated with the passenger transportation scenario. The information can be received at the integrated on-vehicle system 104 and used by the queue management system 106 to manage the queue of passenger waypoints associated with the vehicle 100.

In an embodiment, the integrated on-vehicle system 104 can include at least one memory that can store computer-executable instructions and at least one processor configured to access the at least one memory. The at least one memory and at least one processor can be defined as a logic device of the integrated on-vehicle system 104. In an embodiment, the logic device of the integrated on-vehicle system 104 can be configured to execute computer-executable instructions. In a more particular embodiment, the logic device may be configured to manage the queue of passenger waypoints. In certain instances, the logic device of the integrated on-vehicle system 104 may be disposed in or on the vehicle 100. The logic device of the integrated on-vehicle system 104 can be separate from the logic device of the VDS 102. That is, for example, the logic devices of the integrated on-vehicle system 104 and the VDS 102 can include different processors and memory. In a particular instance, the logic device of the VDS 102 may be configured to perform driving functions independent of the logic device of the integrated on-vehicle system 104. In another instance, the logic device of the integrated on-vehicle system 104 may be configured to perform queue management independent of the logic device of the VDS 102.

The integrated on-vehicle system 104 can communicate with the VDS 102. In an embodiment, the integrated on-vehicle system 104 can be configured to assign the passenger waypoints to the VDS 102. For example, after receiving a passenger waypoint from the cloud 108, the integrated on-vehicle system 104 can communicate a pick-up location with the VDS to navigate to the pick-up location. The integrated on-vehicle system 104 can further communicate the drop-off location to the VDS. In an embodiment, the integrated on-vehicle system 104 can communicate the pick-up location separately from the drop-off location. For instance, and as described in greater detail below, the integrated on-vehicle system 104 can be configured to communicate the drop-off location after the pick-up location. More particularly, the integrated on-vehicle system 104 may communicate each passenger waypoint after completion of a criteria associated with the previous passenger waypoint. The criteria can include, for example, a fixed proximity with respect to the current passenger waypoint (e.g., the integrated on-vehicle system 104 communicates the next waypoint to the VDS 102 just prior to arrival at the current passenger waypoint), before offloading the passenger associated with the current passenger waypoint, during offloading of the passenger, or just after offloading the passenger.

In an embodiment, the integrated on-vehicle system 104 can store the queue locally at the vehicle 100. For example, the integrated on-vehicle system 104 can include memory 110 configured to store information (e.g., passenger waypoints) associated with the queue management system 106. In the event of a dropped signal with the cloud 108, the integrated on-vehicle system 104 can use the memory 110 to perform TaaS for the passengers within the vehicle 100 without interruption.

Figure 2:
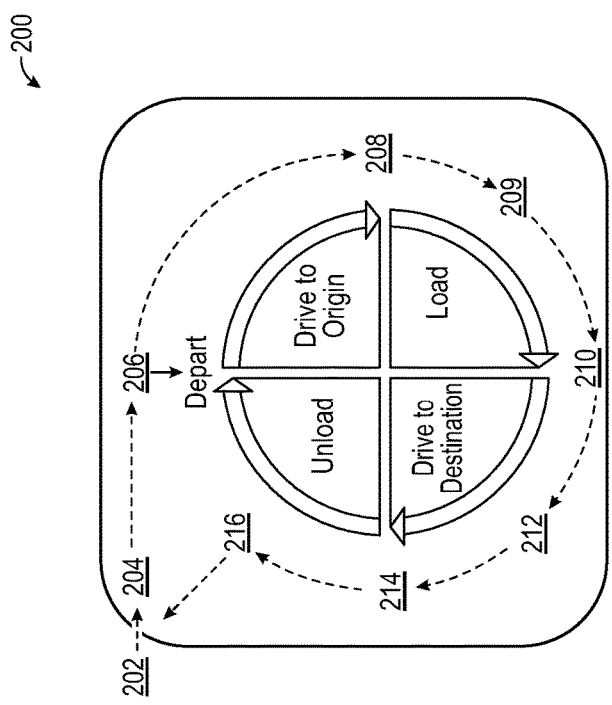
FIG. 2 illustrates a simplified method of autonomous transportation in accordance with one or more exemplary embodiments of the present disclosure.

FIG. 2 illustrates a simplified method 200 of autonomous transportation in accordance with one or more exemplary embodiments of the present disclosure.

The method 200 includes receiving, by a vehicle, information associated with a passenger waypoint (e.g., a pick-up location) at step 202. In an embodiment, the information associated with the passenger waypoint can include the pick-up location for a passenger, the passenger name or other identifying information, the number of occupants with the passenger, and various meta data (e.g., trip ID number, sequencing information relating to queue management). In a further embodiment, the information associated with the passenger waypoint can include the drop-off location for the passenger.

In an embodiment, the information associated with the passenger waypoint at step 202 can be assigned from the cloud 108 (FIG. 1). That is, the vehicle can receive the information when in communication with the cloud 108. In certain instances, the cloud 108 may assign the information on a rolling basis. In other instances, the cloud 108 may assign information at one or more prescribed times/occurrences.

At step 204, the integrated on-vehicle system can insert the received passenger waypoint into a queue of passenger waypoints. Inserting the received passenger waypoint can include determining a sequential aspect of the pick-up and drop-off locations with respect to other passenger waypoints. For example, if a vehicle already has two passengers and is picking up a third passenger before dropping off the two current passengers, the integrated on-vehicle system can decide whether to drop off one or both of the two current passengers before picking up the third passenger. Moreover, assuming the third passenger is picked up and rides with the two current passengers, the integrated on-vehicle system can determine which passenger should be dropped off first. If, for instance (and by way of non-limiting example), the two original passengers are traveling to a further destination than the third passenger, then the third passenger may be the first to offboard from the vehicle. If, however (and by way of non-limiting example), one or both of the two original passengers are traveling to nearer destinations than the third passenger, then the first and/or second passengers may be first to offboard. The integrated on-vehicle system can be programmed to manage sequencing priority. In another embodiment, the sequential aspect of pick-up and drop-off locations can be managed and/or provided directly by the cloud 108 to the integrated on-vehicle system.

Assuming the newly received passenger waypoint is determined as the next vehicle waypoint, then the integrated on-vehicle system can assign the passenger pick-up location to the VDS at step 206. Assignment information can include, for example, coordinates of the pick-up location in latitude and longitude, a street address, another means of identifying the pick-up location, or any combination thereof. In certain instances, the integrated on-vehicle system can wait to assign the newly received passenger waypoint to the VDS if the newly received passenger waypoint is not the next vehicle waypoint (e.g., an existing passenger is being dropped off before picking up the passenger associated with the newly received waypoint).

At steps 206 to 208, the VDS can drive to the pick-up location to onboard the passenger associated with the passenger waypoint. It is noted that step 208 may occur after one or more intermediary steps (e.g., the vehicle may travel to a waypoint associated with a different passenger prior to driving to the pick-up location of the described passenger). After arriving at the pick-up location and loading the passenger associated with the passenger waypoint at step 209, the integrated on-vehicle system can assign a new passenger waypoint to the VDS at step 210. In an embodiment, the new passenger waypoint can be assigned after completion of a criteria associated with the previous passenger waypoint. For example, the criteria can include a fixed proximity with respect to the previous passenger waypoint (e.g., the integrated on-vehicle system 104 communicates the next waypoint to the VDS 102 just prior to arrival at the current passenger waypoint), just before offloading the passenger associated with the previous passenger waypoint, during offloading of the passenger, or just after offloading the passenger.

In certain instances, the new passenger waypoint assigned at step 210 can correspond to the passenger most recently onboarded (e.g., the drop-off location of the most recently onboarded passenger). This may occur, for example, if the most recently onboarded passenger is traveling a minimal distance from the current location as compared to other passengers in the vehicle. In other instances, the new passenger waypoint assigned at step 210 corresponds to a passenger other than the most recently onboarded passenger. The integrated on-vehicle system can be configured to manage the queue of passenger waypoints and determine which passenger waypoint is next.

At step 212, the vehicle can drive to the drop-off location associated with the passenger onboarded at step 208. In an embodiment, the vehicle may pick up or drop off one or more additional passengers prior to driving to the drop-off location associated with the passenger onboarded at step 208. That is, the method 200 in FIG. 2 represents a completed cycle of a single transportation scenario (or a single passenger cycle). The method in FIG. 2 may occur successively with other transportation scenarios (e.g., pick-up and drop-off of other passengers), simultaneously with other transportation scenarios, or both. Each transportation scenario may involve one or more passengers. As the transportation scenarios overlap, vehicle cabin occupancy may dictate onboarding and offboarding scenarios and queue management protocol. For instance, if a four seat vehicle currently has four passengers and is assigned a new passenger waypoint to pick up two new passengers, the vehicle may first offboard at least two passengers. This may occur by way of a single waypoint (e.g., two riders are part of a single party) or multiple waypoints (e.g., dropping off two riders at two different waypoints). After offboarding two passengers, the vehicle may either travel to the new passenger waypoint or a waypoint associated with one of the two remaining passengers. Determination of the queue order may correspond to geographical positions of the waypoints, transportation times, traffic density, route selection, or another suitable metrics associated with passenger waypoints and information received from the cloud. In certain instances, determination of queue order may be performed locally at the integrated on-vehicle system. In other instances, the queue order may be determined remotely, such as for example, by the cloud, and communicated to the vehicle, such as through the integrated on-vehicle system.

At step 214, the vehicle can drop off the passenger onboarded at step 208. After successful offboarding, the vehicle can depart from the drop-off waypoint at step 216. It should be understood that departure from the drop-off waypoint at step 216 can occur as a result of the integrated on-vehicle system assigning yet a further waypoint to the VDS, such as a further passenger waypoint associated with a new passenger pickup or existing passenger drop-off.

FIGS. 3A to 3E illustrate exemplary management operations 300 for ongoing management of a queue of passenger waypoints in accordance with one or more exemplary embodiments of the present disclosure.

Figure 3A:
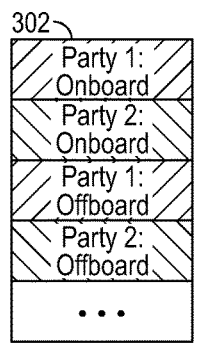
FIGS. 3A to 3E illustrate exemplary management operations for ongoing management of a queue of passenger waypoints in accordance with one or more exemplary embodiments of the present disclosure.

FIG. 3A illustrates an initial queue 302 associated with a queue of passenger waypoints at a first time. The initial queue 302 includes four passenger waypoints associated with two parties (e.g., party 1 and party 2). In an embodiment, parties 1 and 2 can each include a single passenger. In another embodiment, at least one of parties 1 and 2 can include multiple passengers, such as at least two passengers.

The four passenger waypoints in FIG. 3A include, in order, onboarding party 1, onboarding party 2, offboarding party 1, and offboarding party 2. In another exemplary embodiment, the four passenger waypoints can include, in order, onboarding party 1, onboarding party 2, offboarding party 2, and offboarding party 1. In yet a further exemplary embodiment, the four passenger waypoints can include, in order, onboarding party 1, offboarding party 1, onboarding party 2, and offboarding party 2. In certain embodiments, the integrated on-vehicle system can determine the order of priority in view of preset criteria. For example, waypoint priority may relate to geographical positions of the waypoints, transportation times, traffic density, route selection, or another suitable metric. As previously described, the VDS associated with the autonomous vehicle may receive from the integral on-vehicle system only the active passenger waypoint corresponding with the next passenger waypoint the vehicle is assigned to travel to. In other embodiments, the integrated on-vehicle system can utilize a queue order provided by the cloud. In a particular instance, the integrated on-vehicle system can honor the provided the queue order. In another instance, the integrated on-vehicle system can modify the queue order received by the cloud in response to a parameter, restriction, or detected condition. For example, the integrated on-vehicle system may ensure that an onboarding event is completed prior to the corresponding offboarding event.

Figure 3B:
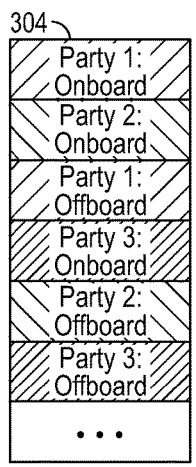

FIG. 3B illustrates an updated queue 304 including waypoints associated with a third party (e.g., a third passenger). As illustrated, onboarding party 3 does not occur until after offboarding party 1. Further, offboarding party 3 does not occur until after offboarding party 2.

Figure 3C:
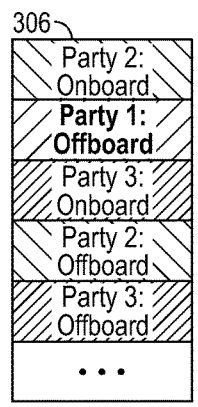
Figure 3D:
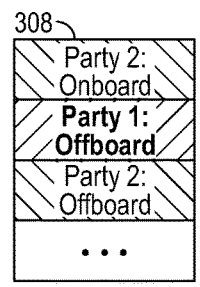
Figure 3E:
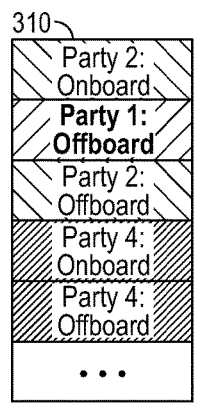

FIG. 3C illustrates a yet further updated queue 306 after completion of party 1 onboarding. The next action in the queue 306 is onboarding party 2 followed by offboarding party 1. FIG. 3D illustrates the queue 308 upon cancellation by party 3. That is, the integrated on-vehicle system can be configured to remove cancelled or otherwise pre-terminated passenger waypoints as part of its function in queue management. FIG. 3E illustrates a further updated queue 310 upon receipt of waypoints associated with a fourth party (e.g., a fourth passenger). As illustrated, parties 1 and 2 are offboarded prior to onboarding party 4. Assuming no further relevant passenger waypoints are received prior to offboarding party 4, party 4 may offboard successively after onboarding.

FIG. 4 illustrates an exemplary logic determination regarding passengers in the vehicle in accordance with one or more embodiments of the disclosure.

In an embodiment, the vehicle can include a device configured to scan the cabin of the vehicle for passenger occupancy. The device can, for example, detect the presence of passengers, count a number of passengers, detect occupied seats of the vehicle, or determine other functionality or occupancy information associated with the vehicle. In an exemplary transportation scenario presented at a first scenario 402, the device scans the vehicle and detects three parties (a previous occupant and two onboarding parties—party 1 and party 2). Party 1 includes, for example, two passengers and party 2 includes 1 passenger. The previous occupant includes one passenger. In an embodiment, the device can detect 4 occupied seats associated with the parties and confirm their presence in the vehicle. In another embodiment, the vehicle can receive passenger-generated information corresponding with passenger presence. The passenger-generated information can be received, for example, through a human-machine-interface (HMI). In a particular embodiment, the HMI may be associated with the vehicle and include a tactile interface, such as a touch screen or one or more selectable buttons or switches. Information corresponding to the passenger-generated information can be communicated to the integrated in-vehicle system which can input the information. Upon confirmation of presence, the vehicle can maintain the current passenger count. This information can be utilized in managing the queue of passenger waypoints.

In a second transportation scenario 404, party 2 may not be detected by the device. In this case, the device may detect the presence of three passengers in the vehicle. The detected number of passengers can differ from the expected number of passengers. Accordingly, the integrated on-vehicle system may consider updating the count of passengers and managing the queue in view of the missing passenger. In certain instances, the integrated on-vehicle system can detect which party is missing (in this case, party 2 is missing). In an embodiment, the integrated on-vehicle system can remove party 2 from the queue of passenger waypoints as indicated in FIG. 3D previously described above.

In a third transportation scenario 406, the device may detect three passengers (i.e., three occupied seats) but the integrated on-vehicle system cannot confirm that parties 1 and 2 are in the vehicle. In such instances, the integrated on-vehicle system may determine the presence of party 1, the presence of party 2 with 1 extra guest, the presence of party 2 and the presence of party 1 with one less guest, or the presence of party 1 and party 2 with the previous occupant no longer in the vehicle. The integrated on-vehicle system may refer to auxiliary information associated with the passengers to determine which previously listed scenario is occurring. For instance, by way of non-limiting example, the integrated on-vehicle system can determine the position of the parties using information associated with their user devices, the integrated on-vehicle system can query the parties for further input, or perform another action associated with the passengers. The integrated on-vehicle system may also or alternatively communicate with the cloud for assistance. The cloud may provide information to the integrated on-vehicle system regarding specific details associated with passenger occupancy.

In a fourth transportation scenario 408, the device may detect three seats occupied and confirm that party 2 is present. In this scenario, the integrated on-vehicle system may determine that party 1 is present minus one guest or that party 1 is present and that the previous occupant left the vehicle. Party 1 may need to update their passenger count to 1 or the integrated on-vehicle system can query the cloud for assistance.

Figure 5:
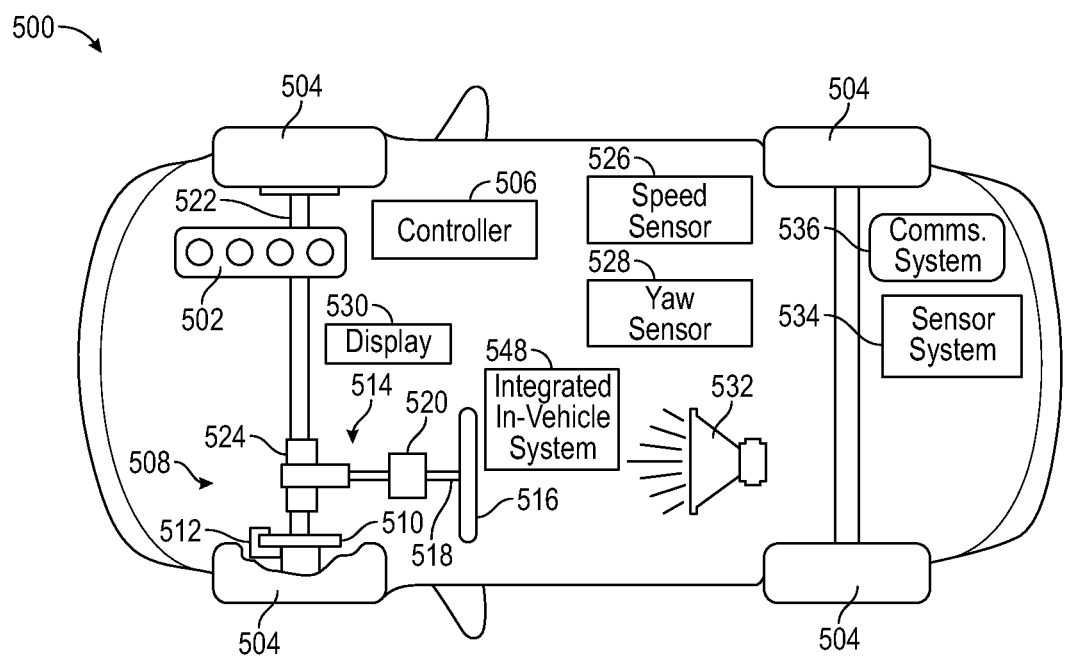
FIG. 5 illustrates a schematic illustration of an example autonomous vehicle in accordance with one or more embodiments of the disclosure.

FIG. 5 illustrates a schematic illustration of an example autonomous vehicle in accordance with one or more embodiments of the disclosure. In particular, the antenna system and associated techniques described herein may be performed on any suitable vehicle including autonomous vehicles. In further examples, the antenna system may facilitate the interaction of an autonomous vehicle with its environment (e.g., a smart-city infrastructure, radio and Internet broadcasts, etc.). Referring to FIG. 5, an example autonomous vehicle 500 (which may correspond to the vehicle 102 of FIG. 1) may include a powerplant 502 (such as a combustion engine and/or an electric motor) that provides torque to drive wheels 504 that propel the vehicle forward or backward. Autonomous vehicle operation, including propulsion, steering, braking, navigation, and the like, may be controlled autonomously by a vehicle controller 506. For example, the vehicle controller 506 may be configured to receive feedback from one or more sensors (e.g., sensor system 534, etc.) and other vehicle components to determine road conditions, vehicle positioning, and so forth. The vehicle controller 506 may also ingest data from the speed monitor and yaw sensor, as well as the tires, brakes, motor, and other vehicle components. The vehicle controller 506 may use the feedback and the route/map data of the route to determine actions to be taken by the autonomous vehicle, which may include operations related to the engine, steering, braking, and so forth. Control of the various vehicle systems may be implemented using any suitable mechanical means, such as servo motors, robotic arms (e.g., to control steering wheel operation, acceleration pedal, brake pedal, etc.), and so forth.

The vehicle controller 506 may include one or more computer processors coupled to at least one memory. The vehicle 500 may include a braking system 508 having disks 510 and calipers 512. The vehicle 500 may include a steering system 514. The steering system 514 may include a steering wheel 516, a steering shaft 518 interconnecting the steering wheel to a steering rack 520 (or steering box). The front and/or rear wheels 504 may be connected to the steering rack 520 via an axle 522. A steering sensor 524 may be disposed/located proximate to the steering shaft 518 to measure a steering angle. The vehicle 500 also includes a speed sensor 526 that may be disposed at the wheels 504 or in the transmission. The speed sensor 526 is configured to output a signal to the controller 506 indicating the speed of the vehicle. A yaw sensor 528 is in communication with the controller 506 and is configured to output a signal indicating the yaw of the vehicle 500.

In some embodiments, the vehicle 508 may include an integrated in-vehicle system 548 that is similar to the device described with respect to FIGS. 1-4 above.

The vehicle 500 includes a cabin having a display 530 in electronic communication with the controller 506. The display 530 may be a touchscreen that displays information to the passengers of the vehicle and/or functions as an input, such as whether or not the rider is authenticated. A person having ordinary skill in the art will appreciate that many different display and input devices are available and that the present disclosure is not limited to any particular display. An audio system 532 may be disposed within the cabin and may include one or more speakers for providing information and entertainment to the driver and/or passengers. The audio system 532 may also include a microphone for receiving voice inputs. The vehicle 500 may include a communications system 536 that is configured to send and/or receive wireless communications via one or more networks. The communications system 536 may be configured for communication with devices in the car or outside the car, such as a user's device, other vehicles, etc.

The vehicle 500 may also include a sensor system for sensing areas external to the vehicle. The vision system may include a plurality of different types of sensors and devices such as cameras, ultrasonic sensors, RADAR, LIDAR, and/or combinations thereof. The vision system may be in electronic communication with the controller 506 for controlling the functions of various components. The controller may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "lookup tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers and/or computer processors. The controller 506 may receive signals from the sensor system 534 and may include memory containing machine-readable instructions for processing the data from the vision system. The controller 506 may be programmed to output instructions to at least the display 530, the audio system 532, the steering system 514, the braking system 808, and/or the powerplant 502 to autonomously operate the vehicle 500.

Figure 6:
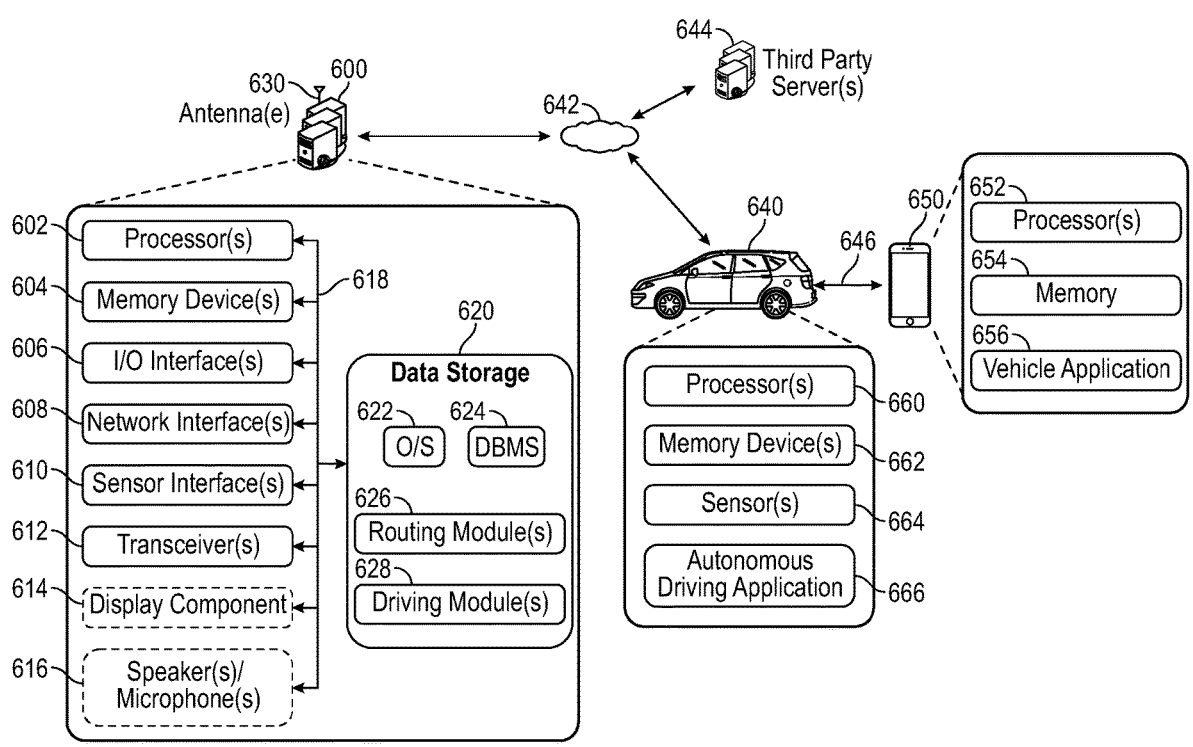
FIG. 6 illustrates a schematic illustration of an example server architecture for one or more server(s) in accordance with one or more embodiments of the disclosure.

FIG. 6 illustrates a schematic illustration of an example server architecture for one or more server(s) 600 in accordance with one or more embodiments of the disclosure. The server 600 illustrated in the example of FIG. 6 may correspond to a computer system configured to implement the functionality discussed with respect to FIGS. 1-5. In particular, the server 600 may be used to configure and/or transmit and receive information from the disclosed antenna system, as further described below. Some or all of the individual components may be optional and/or different in various embodiments. In some embodiments, the server 600 illustrated in FIG. 6 may be located at a vehicle 640. For example, some or all or the hardware and functionality of the server 600 may be provided by the vehicle 640. The server 600 may be in communication with the vehicle 640, as well as one or more third-party servers 644 (e.g., servers that store vehicle condition data, user device data, antenna system data, etc.), and one or more user devices 650. The vehicle 640 may be in communication with the user device 650.

The server 600, the third-party server 644, the vehicle 640, and/or the user device 650 may be configured to communicate via one or more networks 642. The vehicle 640 may additionally be in wireless communication 646 with the user device 650 via a connection protocol such as Bluetooth or Near Field Communication. The server 600 may be configured to communicate via one or more networks 642. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional display components 614, one or more optional camera(s)/speaker(s)/microphone(s) 616, and data storage 620. The server 600 may further include one or more bus(es) 618 that functionally couple various components of the server 600. The server 600 may further include one or more antenna(s) 630 that may include, without limitation, a cellular antenna for transmitting or receiving signals to/from a cellular network infrastructure, an antenna for transmitting or receiving Wi-Fi signals to/from an access point (AP), a GNSS antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the server 600. The bus(es) 618 may include, without limitation, a memory bus or a memory controller, a peripheral bus, an accelerated graphics port, and so forth. The bus(es) 618 may be associated with any suitable bus architecture.

The memory 604 of the server 600 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The data storage 620 may include removable storage and/or non-removable storage including, but not limited to, magnetic storage, optical disk storage, and/or tape storage. The data storage 620 may provide non-volatile storage of computer-executable instructions and other data.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. More specifically, the data storage 620 may store one or more operating systems (O/S) 622; one or more database management systems (DBMSs) 624; and one or more program module(s), applications, engines, computer-executable code, scripts, or the like such as, for example, one or more routing module(s) 626 and/or one or more driving module(s) 628. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The processor(s) 602 may be configured to access the memory 604 and execute the computer-executable instructions loaded therein. For example, the processor(s) 602 may be configured to execute the computer-executable instructions of the various program module(s), applications, engines, or the like of the server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit.

Referring now to functionality supported by the various program module(s) depicted in FIG. 6, the routing module(s) 626 may include computer-executable instructions, code, or the like that responsive to execution by one or more of the processor(s) 602 may perform one or more blocks of the process flows herein and/or functions including, but not limited to, determining vehicle conditions described herein based on data from vehicle devices and/or sensors, determining vehicle locations, determining antenna switching behavior, and/or the like.

The routing module 626 may be in communication with the vehicle 640, the third-party server 644, the user device 650, and/or other components. For example, the routing module may send route data to the vehicle 640, receive data from the third-party server 644, receive user selections from the user device 650, and so forth.

The driving module(s) 628 may include computer-executable instructions, code, or the like that responsive to execution by one or more of the processor(s) 602 may perform functions including, but not limited to, sending and/or receiving data, determining a vehicle condition, and the like. In some embodiments, the driving module 628 may be partially or wholly integral to the vehicle 640.

The driving module 628 may be in communication with the vehicle 640, the third-party server 644, the user device 650, and/or other components. For example, the driving module may send traffic information to the vehicle 640, receive location data from the third-party server 644, receive user inputs (e.g., login information for a wireless connection) from user device 650, and so forth.

Referring now to other illustrative components depicted as being stored in the data storage 620, the O/S 622 may be loaded from the data storage 620 into the memory 604 and may provide an interface between other application software executing on the server 600 and the hardware resources of the server 600.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. As noted, in various embodiments, databases may store information associated with antenna systems and/or vehicle conditions.

Referring now to other illustrative components of the server 600, the input/output (I/O) interface(s) 606 may facilitate the receipt of input information by the server 600 from one or more I/O devices as well as the output of information from the server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 606 may also include a connection to one or more of the antenna(s) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 600 may further include one or more network interface(s) 608 via which the server 600 may communicate with any of a variety of other systems, platforms, networks, devices, and so forth. The network interface(s) 608 may enable communication, for example, with one or more wireless routers, one or more host servers, one or more web servers, and the like via one or more networks.

The sensor(s)/sensor interface(s) 610 may include or may be capable of interfacing with any suitable type of sensing device such as, for example, inertial sensors, force sensors, thermal sensors, photocells, and so forth.

The display component(s) 614 may include one or more display layers, such as LED or LCD layers, touchscreen layers, protective layers, and/or other layers. The optional camera(s) 616 may be any device configured to capture ambient light or images. The optional microphone(s) 616 may be any device configured to receive analog sound input or voice data. The microphone(s) 616 may include microphones used to capture sound.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module.

It should further be appreciated that the server 600 may include alternate and/or additional hardware, software, or firmware components beyond those described or depicted without departing from the scope of the disclosure.

The user device 650 may include one or more computer processor(s) 652, one or more memory devices 654, and one or more applications, such as a vehicle application 656. Other embodiments may include different components.

The processor(s) 652 may be configured to access the memory 654 and execute the computer-executable instructions loaded therein. For example, the processor(s) 652 may be configured to execute the computer-executable instructions of the various program module(s), applications, engines, or the like of the device to cause or facilitate various operations to be performed in accordance with one or more embodiments of the disclosure. The processor(s) 652 may include any suitable processing unit capable of accepting data as input, processing the input data in accordance with stored computer-executable instructions, and generating output data. The processor(s) 652 may include any type of suitable processing unit.

The memory 654 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the user device 650, the vehicle application 656 may be a mobile application executable by the processor 652 that can be used to present options and/or receive user inputs of information related to network status, external connections, user device status and/or the like.

The vehicle 640 may include one or more computer processor(s) 660, one or more memory devices 662, one or more sensors 664, and one or more applications, such as an autonomous driving application 666. Other embodiments may include different components.

The processor(s) 660 may be configured to access the memory 662 and execute the computer-executable instructions loaded therein. For example, the processor(s) 660 may be configured to execute the computer-executable instructions of the various program module(s), applications, engines, or the like of the device to cause or facilitate various operations to be performed in accordance with one or more embodiments of the disclosure. The processor(s) 660 may include any suitable processing unit capable of accepting data as input, processing the input data in accordance with stored computer-executable instructions, and generating output data. The processor(s) 660 may include any type of suitable processing unit.

The memory 662 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the vehicle 640, the autonomous driving application 666 may be an application executable by the processor 660 that can be used to receive data from the sensors 664, and/or control operation of the vehicle 640.

One or more operations of the methods, process flows, and use cases of FIGS. 1-6 may be performed by one or more engines, program module(s), applications, or the like executable on an electronic device. It should be appreciated, however, that such operations may be implemented in connection with numerous other device configurations.

The operations described and depicted in the illustrative methods and process flows of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The terms "generally," "substantially," "approximately," and the like are intended to cover a range of deviations from the given value. In a particular embodiment, the terms "generally," "substantially," "approximately," and the like refer to deviations in either direction of the value within 10% of the value, within 9% of the value, within 8% of the value, within 7% of the value, within 6% of the value, within 5% of the value, within 4% of the value, within 3% of the value, within 2% of the value, or within 1% of the value.

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Example Embodiments

In some instances, the following examples may be implemented together or separately by the systems and methods described herein.

Example 1 may include an autonomous vehicle, comprising: a virtual driver system (VDS); and an integrated on-vehicle system having a queue management system configured to manage a queue of passenger waypoints, wherein the integrated on-vehicle system is configured to assign the passenger waypoints to the VDS.

Example 2 may include the autonomous vehicle of example 1 and/or some other example herein, wherein a logic device of the integrated on-vehicle system is separate from a logic device of the VDS.

Example 3 may include the autonomous vehicle of example 1 and/or some other example herein, wherein the passenger waypoints correspond with one or more passenger pick-up or drop-off locations associated with passengers of the autonomous vehicle.

Example 4 may include the autonomous vehicle of example 1 and/or some other example herein, wherein the integrated on-vehicle system is configured to assign each waypoint to the VDS after completion of a criteria associated with the previous passenger waypoint.

Example 5 may include the autonomous vehicle of example 1 and/or some other example herein, wherein the integrated on-vehicle system further comprises a memory device configured to store information relating to the queue of passenger waypoints.

Example 6 may include the autonomous vehicle of example 1 and/or some other example herein, wherein integrated on-vehicle system is configured to adjust the queue of passenger waypoints when the autonomous vehicle receives new passenger waypoints.

Example 7 may include the autonomous vehicle of example 1 and/or some other example herein, wherein the integrated on-vehicle system is configured to determine or receive from a cloud server information corresponding with a linger duration during passenger onboarding and offboarding.

Example 8 may include an integrated on-vehicle system for an autonomous vehicle, the integrated on-vehicle system comprising: a queue management system comprising at least one memory that stores computer-executable instructions, and at least one processor configured to access the at least one memory, wherein the at least one processor is configured to execute the computer-executable instructions to: determine a queue of passenger waypoints; and assign each passenger waypoint to a virtual driver system (VDS) of the autonomous vehicle.

Example 9 may include the integrated on-vehicle system of example 8 and/or some other example herein, wherein the integrated on-vehicle system is separate from a logic device of the VDS.

Example 10 may include the integrated on-vehicle system of example 8 and/or some other example herein, wherein the passenger waypoints correspond with one or more passenger pick-up or drop-off locations associated with passengers of the autonomous vehicle.

Example 11 may include the integrated on-vehicle system of example 8 and/or some other example herein, wherein the integrated on-vehicle system is configured to assign each waypoint to the VDS after completion of a criteria associated with the previous passenger waypoint.

Example 12 may include the integrated on-vehicle system of example 8 and/or some other example herein, wherein the at least one memory of the queue management system is configured to store information relating to the queue of passenger waypoints.

Example 13 may include the integrated on-vehicle system of example 8 and/or some other example herein, wherein the integrated on-vehicle system is configured to adjust the queue of passenger waypoints when the autonomous vehicle receives new passenger waypoints.

Example 14 may include the integrated on-vehicle system of example 8 and/or some other example herein, wherein the integrated on-vehicle system is configured to determine or receive from a cloud server information corresponding with a linger duration during passenger onboarding and offboarding.

Example 15 may include a method of autonomous transportation, comprising: receiving, by an integrated on-vehicle system of an autonomous vehicle, passenger waypoint information corresponding to passenger pick-up and drop-off locations; determining, by the integrated on-vehicle system of the autonomous vehicle, a queue of passenger waypoints; and determining, by the integrated on-vehicle system of the autonomous vehicle, assignments of each passenger waypoint for a virtual driver system (VDS) of the autonomous vehicle.

Example 16 may include the method of example 15 and/or some other example herein, wherein managing the queue of passenger waypoints further comprises adjusting the queue of passenger waypoints when the autonomous vehicle receives new passenger waypoints.

Example 17 may include the method of example 15 and/or some other example herein, further comprising storing information relating to the queue of passenger waypoints in memory associated with the integrated on-vehicle system.

Example 18 may include the method of example 15 and/or some other example herein, further comprising: determining, by the integrated on-vehicle system, or receiving, from a cloud server, information corresponding with a linger duration during passenger onboarding and offboarding.

Example 19 may include the method of example 15 and/or some other example herein, wherein assigning each passenger waypoint is performed after completion of a criteria associated with the previous passenger waypoint by the autonomous vehicle.

Example 20 may include the method of example 19 and/or some other example herein, wherein the criteria comprises completion of a previous passenger pickup or drop-off.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the vehicular and transportation arts.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. An autonomous vehicle, comprising:
a virtual driver system (VDS); and
an integrated on-vehicle system having a queue management system configured to manage a queue of passenger waypoints, wherein the integrated on-vehicle system is configured to assign the passenger waypoints to the VDS, and wherein the passenger waypoints correspond with one or more pick-up or drop-off locations to be stored within the autonomous vehicle,
wherein the integrated on-vehicle system is configured to re-manage the queue of passenger waypoints based at least in part on a detected number of passengers in the autonomous vehicle,
wherein the queue of passenger waypoints corresponds to a sequential aspect of the passenger waypoints with respect to each of the passenger waypoints,
wherein the integrated on-vehicle system is configured to determine or receive from a cloud server information corresponding with a linger duration during passenger onboarding and offboarding, and wherein the autonomous vehicle is configured to close a vehicle door when no passengers are detected and the linger duration is exceeded, and
wherein the integrated on-vehicle system is further configured to determine a presence of each party assigned to the autonomous vehicle, the each party having additional or less guests than expected, and to subsequently query the each party or the cloud server for assistance.

2. The autonomous vehicle of claim 1, wherein a logic device of the integrated on-vehicle system is separate from a logic device of the VDS.

3. The autonomous vehicle of claim 1, wherein the passenger waypoints correspond with one or more sequential pick-up or drop-off locations associated with the autonomous vehicle.

4. The autonomous vehicle of claim 1, wherein the queue of passenger waypoints includes a first passenger waypoint and a second passenger waypoint, and wherein the integrated on-vehicle system is configured to assign the second passenger waypoint to the VDS after completion of a criteria associated with the first passenger waypoint, and wherein the criteria comprises a predetermined proximity to the first passenger waypoint.

5. The autonomous vehicle of claim 1, wherein the integrated on-vehicle system further comprises a memory device configured to store information relating to the queue of passenger waypoints.

6. The autonomous vehicle of claim 1, wherein the integrated on-vehicle system is configured to adjust the queue of passenger waypoints when the autonomous vehicle receives new passenger waypoints.

7. The autonomous vehicle of claim 1, wherein the linger duration is relative to a passenger-specific condition.

8. An integrated on-vehicle system for an autonomous vehicle, the integrated on-vehicle system comprising:
a queue management system comprising
at least one memory that stores computer-executable instructions, and
at least one processor configured to access the at least one memory, wherein the at least one processor is configured to execute the computer-executable instructions to:
determine a queue of passenger waypoints; and
assign each passenger waypoint to a virtual driver system (VDS) of the autonomous vehicle, and wherein each passenger waypoint corresponds with one or more pick-up or drop-off locations to be stored within the autonomous vehicle,
wherein the integrated on-vehicle system is configured to re-manage the queue of passenger waypoints based at least in part on a detected number of passengers in the autonomous vehicle,
wherein the queue of passenger waypoints corresponds to a sequential aspect of the passenger waypoints with respect to each passenger waypoint, and
wherein the integrated on-vehicle system is configured to determine or receive from a cloud server information corresponding with a linger duration during passenger onboarding and offboarding, and wherein the autonomous vehicle is configured to close a vehicle door when no passengers are detected and the linger duration is exceeded, and wherein the integrated on-vehicle system is further configured to determine a presence of each party assigned to the autonomous vehicle, the each party having additional or less guests than expected, and to subsequently query the each party or the cloud server for assistance.

9. The integrated on-vehicle system of claim 8, wherein the integrated on-vehicle system is separate from a logic device of the VDS.

10. The integrated on-vehicle system of claim 8, wherein the passenger waypoints correspond with one or more sequential pick-up or drop-off locations associated with passengers of the autonomous vehicle.

11. The integrated on-vehicle system of claim 8, wherein the queue of passenger waypoints includes a first passenger waypoint and a second passenger waypoint, and wherein the integrated on-vehicle system is configured to assign the second passenger waypoint to the VDS after completion of a criteria associated with the first passenger waypoint, and wherein the criteria comprises a predetermined proximity to the first passenger waypoint.

12. The integrated on-vehicle system of claim 8, wherein the at least one memory of the queue management system is configured to store information relating to the queue of passenger waypoints.

13. The integrated on-vehicle system of claim 8, wherein the integrated on-vehicle system is configured to adjust the queue of passenger waypoints when the autonomous vehicle receives new passenger waypoints.

14. The integrated on-vehicle system of claim 8, wherein the linger duration is relative to a passenger-specific condition.

15. A method of autonomous transportation, comprising:
receiving, by an integrated on-vehicle system of an autonomous vehicle, passenger waypoint information corresponding to passenger pick-up and drop-off locations;
determining, by the integrated on-vehicle system of the autonomous vehicle, a queue of passenger waypoints; and
determining, by the integrated on-vehicle system of the autonomous vehicle, assignments of each passenger waypoint for a virtual driver system (VDS) of the autonomous vehicle, and wherein each passenger waypoint corresponds with one or more pick-up or drop-off locations to be stored within the autonomous vehicle,
wherein the integrated on-vehicle system is configured to re-manage the queue of passenger waypoints based at least in part on a detected number of passengers in the autonomous vehicle,
wherein the queue of passenger waypoints corresponds to a sequential aspect of the passenger waypoints with respect to each passenger waypoint, and
wherein the integrated on-vehicle system is configured to determine or receive from a cloud server information corresponding with a linger duration during passenger onboarding and offboarding, and wherein the autonomous vehicle is configured to close a vehicle door when no passengers are detected and the linger duration is exceeded, and
wherein the integrated on-vehicle system is further configured to determine a presence of each party assigned to the autonomous vehicle, the each party having additional or less guests than expected, and to subsequently query the each party or the cloud server for assistance.

16. The method of claim 15, wherein managing the queue of passenger waypoints further comprises adjusting the queue of sequential passenger waypoints when the autonomous vehicle receives new passenger waypoints.

17. The method of claim 15, further comprising storing information relating to the queue of passenger waypoints in memory associated with the integrated on-vehicle system.

18. The method of claim 15, wherein the linger duration is relative to a passenger-specific condition.

19. The method of claim 15, wherein the queue of passenger waypoints includes a first passenger waypoint and a second passenger waypoint, and wherein assigning the second passenger waypoint is performed after completion of a criteria associated with the first passenger waypoint by the autonomous vehicle, and wherein the criteria comprises a predetermined proximity to the first passenger waypoint.

20. The method of claim 19, wherein the criteria further comprises completion of a first passenger pickup or drop-off.

* * * * *